United States Patent
Heien

(12) 
(10) Patent No.: US 6,357,765 B1
(45) Date of Patent: Mar. 19, 2002

(54) OBSTACLE TRAVERSING WHEEL ASSEMBLY

(76) Inventor: Troy A. Heien, 5704 S. View Rd., Laramie, WY (US) 82070

( * ) Notice: Subject to any disclaimer, the term of this patent is extended or adjusted under 35 U.S.C. 154(b) by 0 days.

(21) Appl. No.: 09/630,566

(22) Filed: Aug. 3, 2000

(51) Int. Cl.[7] ................................................. B62B 5/02
(52) U.S. Cl. ........................ 280/5.26; 280/5.2; 301/5.23
(58) Field of Search ................................. 280/5.2, 5.26, 280/5.28, 29, DIG. 10, 37, 11.222, 5.32; 305/4; 301/1, 5.1, 5.23; 16/18 B, 18 R

(56) References Cited

U.S. PATENT DOCUMENTS

| | | | |
|---|---|---|---|
| 722,433 A | * | 3/1903 | Ritchie |
| 795,620 A | * | 7/1905 | Jones |
| 1,326,679 A | * | 12/1919 | Macbeth et al. |
| 2,706,640 A | | 4/1955 | Marshall ..................... 280/5.6 |
| 2,736,564 A | * | 2/1956 | Loam et al. |
| 3,326,563 A | | 6/1967 | Whitaker .................... 280/5.26 |
| 4,142,732 A | | 3/1979 | Boyd .......................... 280/5.26 |
| 4,421,189 A | | 12/1983 | Watkins et al. ............. 180/8 A |
| 4,457,526 A | | 7/1984 | Persson ...................... 280/5.26 |
| 4,512,588 A | * | 4/1985 | Cox ............................ 280/5.26 |
| 4,687,213 A | | 8/1987 | Ridderstolpe .............. 280/5.26 |
| 4,709,772 A | | 12/1987 | Brunet ........................ 180/8.2 |
| 5,720,529 A | * | 2/1998 | Barron ........................ 301/5.3 |

FOREIGN PATENT DOCUMENTS

| | | | | |
|---|---|---|---|---|
| DE | 901735 | * | 7/1949 | ................. 280/5.26 |
| DE | 2135848 | * | 2/1973 | ................. 301/5.23 |
| FR | 672078 | * | 12/1929 | ................. 301/5.23 |
| FR | 2640204 | * | 6/1990 | ................. 301/5.23 |
| NL | 6409073 | * | 7/1965 | ................. 280/5.26 |

* cited by examiner

*Primary Examiner*—Anne Marie Boehler
(74) *Attorney, Agent, or Firm*—Roland H. Shubert

(57) ABSTRACT

An obstacle traversing wheel assembly that rolls easily without dragging over electrical cords, trash and debris includes a primary wheel that is journaled on an axle which is attached to a load carrying frame. At least four independently rotatable secondary wheels are mounted around the circumference of the primary wheel at locations equidistant from each other and from the primary wheel axle. The secondary wheels are all of the same diameter and are spaced apart on the primary wheel at a distance that is less than the diameter of a secondary wheel. The wheel assembly finds use as the wheel members on luggage, as the leading wheel of an in-line skate board, and for supporting any other load carrying module that is rolled across a debris-strewn surface.

21 Claims, 6 Drawing Sheets

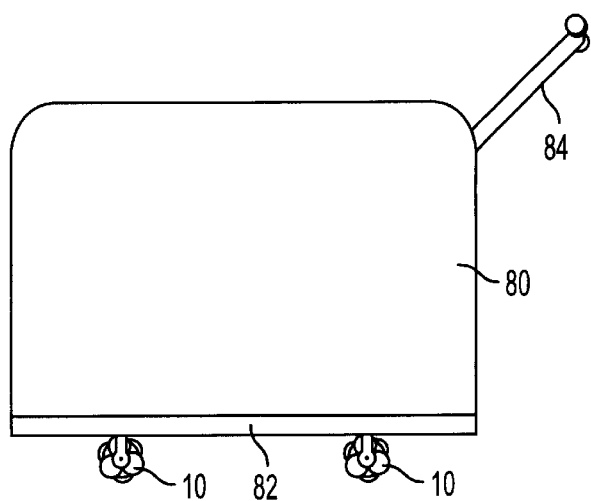
FIG. 7
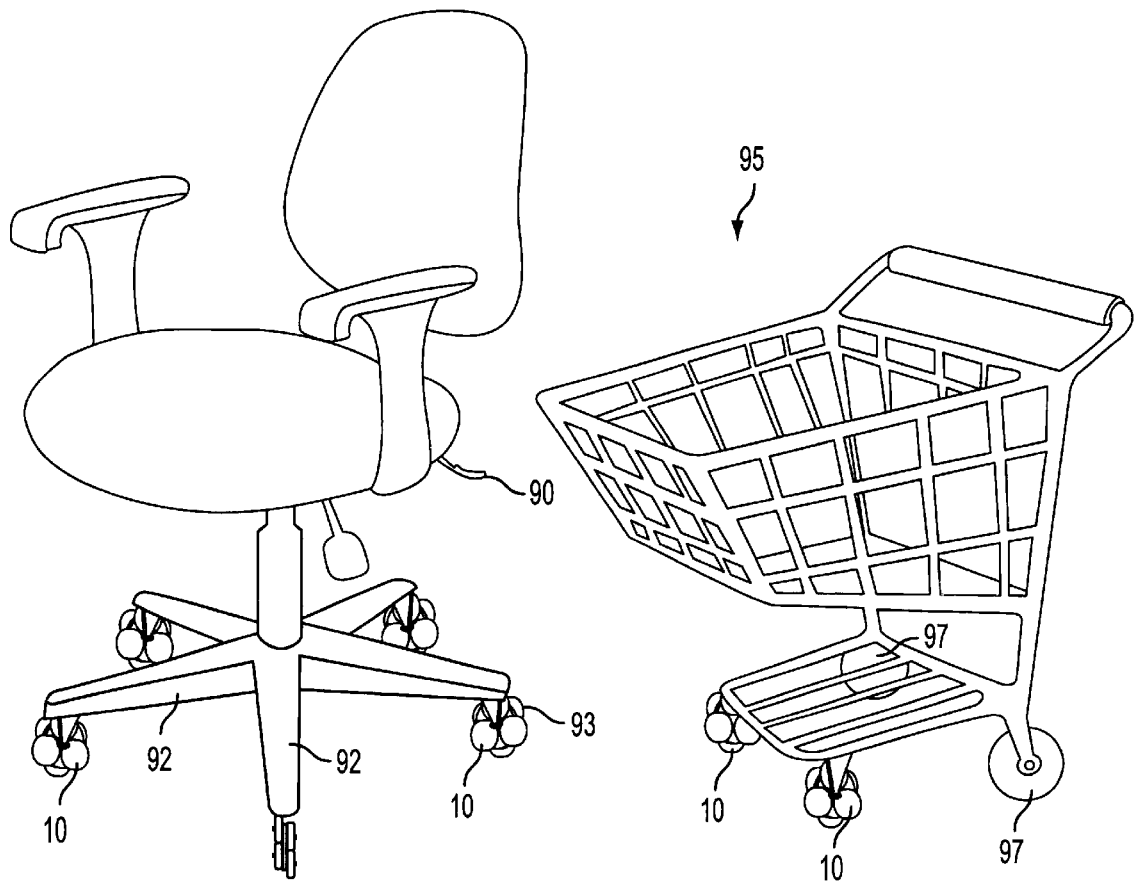
FIG. 8
FIG. 9

OBSTACLE TRAVERSING WHEEL ASSEMBLY

BACKGROUND OF THE INVENTION

1. Technical Field

This invention relates to a wheel assembly that can traverse rough surfaces and roll over small obstacles without dragging.

More particularly, this invention relates to a wheel assembly which comprises a wheel holder that is rotatable about a central axis, the wheel holder having mounted thereon at least four independently rotatable wheels.

2. Background Art

Hand trucks or dollies used to transport loads up and down stairways have long used a wheel arrangement consisting of a pair of star-shaped plates which rotate about a main axle and include a number of wheels, usually three or four, mounted on stub axles. Such a wheel arrangement is often referred to as a spider or star wheel. The plates and wheels are sized such that two of the stub axle mounted wheels can be in simultaneous contact with the lands of two adjacent steps.

A stair climbing hand truck equipped with a pair of star wheels, each having four radially projecting arms spaced at 90° one to another, is described in U.S. Pat. No. 2,706,640 to Marshall. Roller wheels are mounted at the arm ends. The star wheel used by Marshall is sized such that two adjacent roller wheels can simultaneously contact the lands of two adjacent steps when the hand truck ascends or descends a stairway.

Another hand truck having stair climbing capabilities is disclosed in the Boyd patent, U.S. Pat. No. 4,142,732. The Boyd truck employs a pair of star-like plates journaled on a main axle with each plate carrying three stub axles, one on each projecting plate leg. A wheel is mounted on each stub axle and the plate and wheels are sized such that wheels are in contact with the lands of two adjacent steps at all times while the truck is on a stairway.

A motorized wheel chair that is able to go up and down stairs and climb sidewalk or pavement curbs is shown in U.S. Pat. No. 4,709,772. The wheel chair uses a pair of wheel assemblies, each comprising three wheels mounted on a triangular support frame. Each frame and wheel assembly is rotated by a powered shaft that is fixed to the frame center.

Wheel assemblies for traversing obstacles and to climb stairs are shown in U.S. Pat. No. 3,326,563 to Whitacker, U.S. Pat. No. 4,457,526 to Persson, and U.S. Pat. No. 4,687,213 to Ridderstolpe. The wheel assemblies described in the three patents all use a star or spider wheel arrangement in which three wheels are mounted symmetrically on a plate or support member which in turn rotates about a main shaft or axle.

While the wheel assemblies of the type shown in the above listed prior art work well at climbing stairs and curbs, none of those designs can be successfully scaled down in size to use on items which require a relatively small diameter wheel such as luggage, in-line skates and skate boards, grocery carts, electronic test equipment carts and the like. The need for a simple and inexpensive wheel assembly that can traverse small obstructions such as hose lines, electrical cords, twigs and small branches, gravel, sidewalk irregularities and the like without wheel dragging has long been present. This invention fills that need.

SUMMARY OF THE INVENTION

This invention provides a wheel assembly that can freely roll or climb over small obstacles such as electrical cords, pavement irregularities, small stones and other trash without wheel drag. The assembly includes a primary wheel member that is rotatable about a central axis. At least four smaller secondary wheels are mounted on axles attached around the circumference of the primary wheel at locations equidistant from each other and from the central axis. Each secondary wheel has a diameter that is greater than is the distance between adjacent wheel locations, and is free to rotate about its axis. The wheel assemblies of this invention roll easily across electrical cords, pneumatic lines and small trash, and are particularly useful on rolling luggage, tool carts, electronic test equipment, skates, chairs, and the like.

Thus, the primary object of this invention is to provide a wheel assembly that rolls over obstacles without wheel drag. Other objects of the invention will be evident from the drawings and the description of preferred embodiments.

BRIEF DESCRIPTION OF THE DRAWING

FIG. 7 illustrates the wheel assembly of this invention mounted upon the frame of a carrier module which may be a piece of luggage, a tool holder, an electronic test device, or similar article;

FIG. 8 shows the wheel assembly of this invention in use with furniture, specifically an office chair;

FIG. 9 depicts the wheel assembly of this invention as used in a grocery cart.

DETAILED DESCRIPTION OF THE INVENTION

Figure 1:
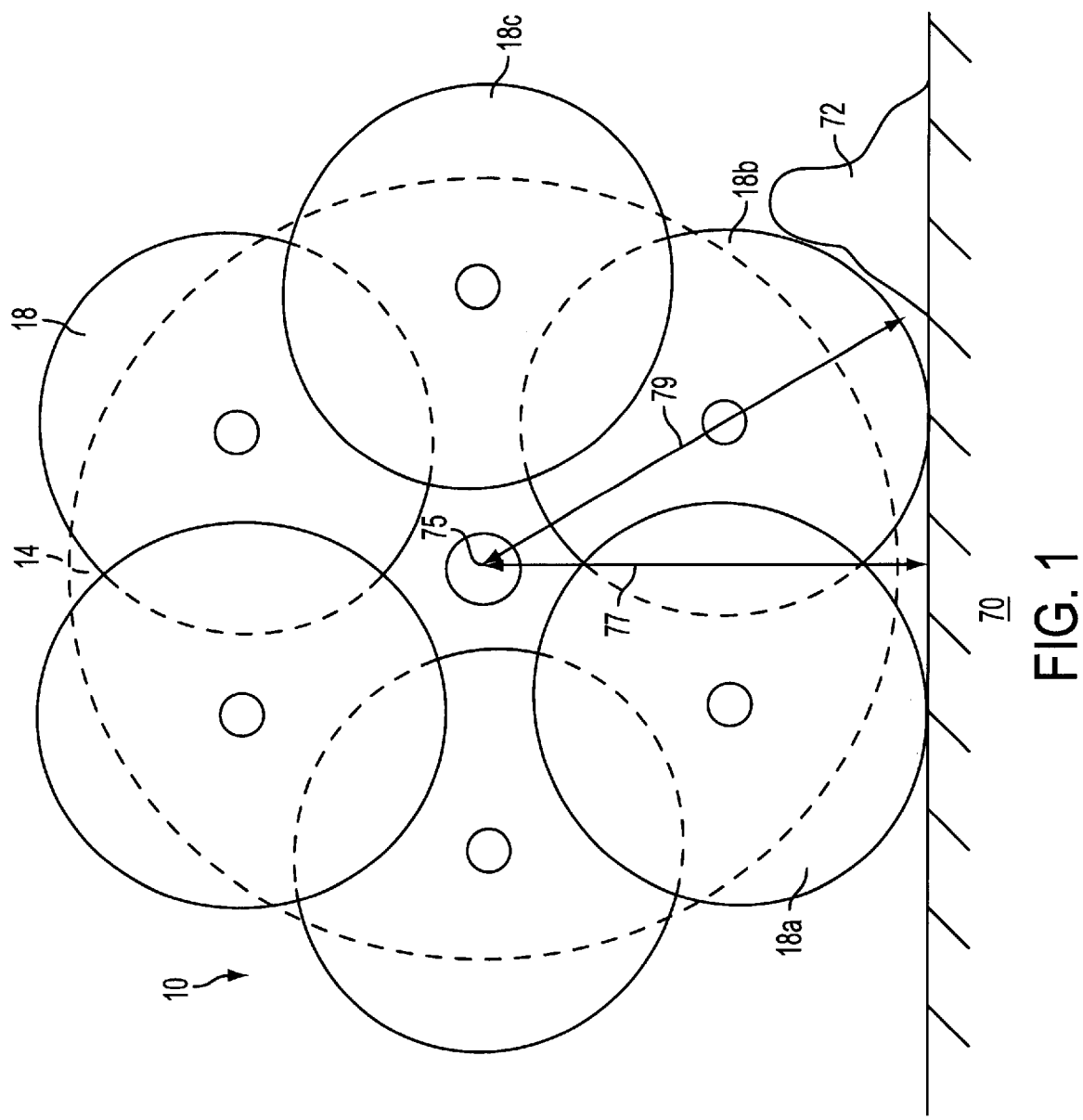
FIG. 1 is a partially broken away side view of the wheel assembly of this invention showing the primary wheel member with six secondary wheels mounted thereon rolling on an obstructed surface.
Figure 2:
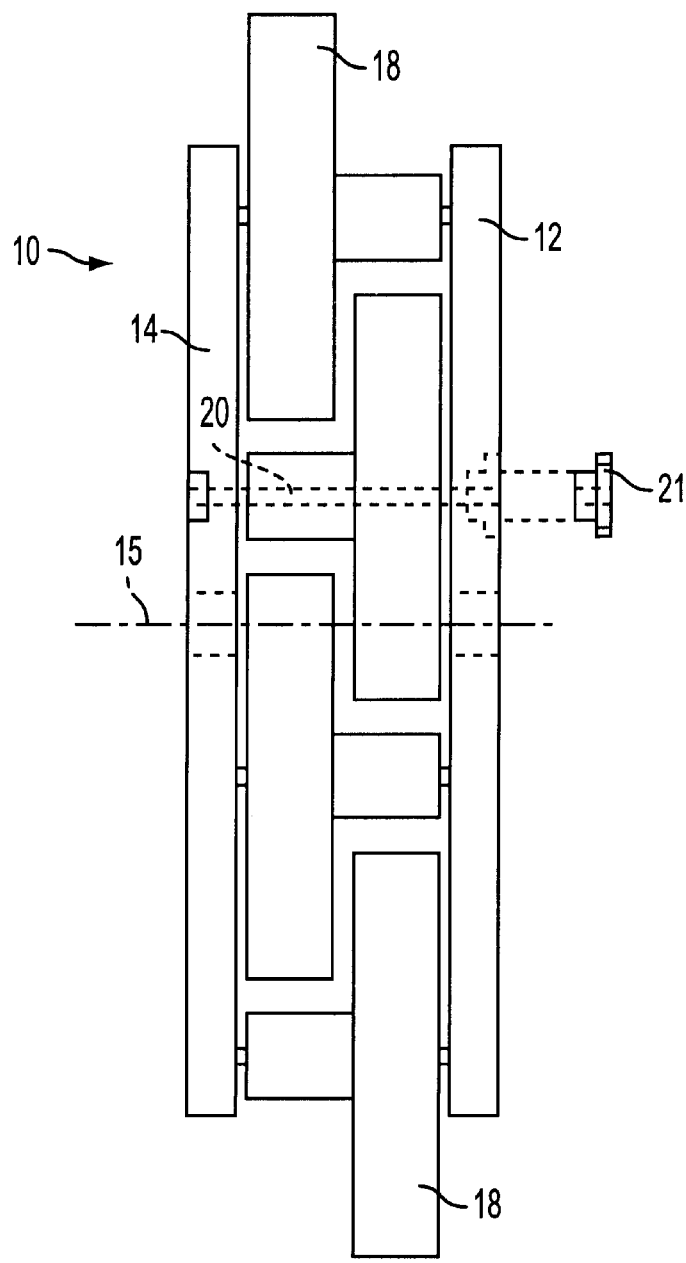
FIG. 2 is an end-on view showing a first embodiment of the wheel assembly of FIG. 1.

Referring first to FIGS. 1 and 2, there is shown a first preferred embodiment of the obstacle surmounting wheel assembly 10 of this invention. The assembly 10 includes a primary wheel comprising a pair of wheel holders 12 and 14 arranged to rotate about a central axis 15. Wheel holders 12 and 14 preferably are formed as two parallel, spaced apart, circular, plate-like members having a central bore to accommodate an axle about which the primary wheel rotates. At least four secondary, equal diameter, wheels 18 are rotatably mounted between holders 12 and 14 by means of a journaled axle 20 extending between holders 12 and 14 and secured in place by a nut or other locking means 21. Wheels 18 are spaced apart a distance that is less than one wheel diameter, and are located equidistant from each other and from axle 20.

Figure 3:
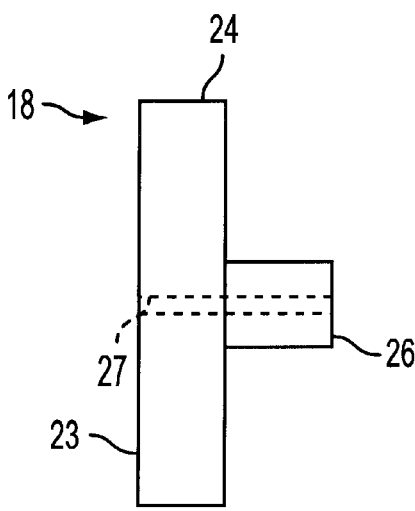
FIG. 3 is a detail view of a secondary wheel used in the embodiment of FIG. 2.

In this embodiment, secondary wheels 18 may be configured as shown in the view of FIG. 3. Wheel 18 of FIG. 3 includes a circular disk-like portion 23 having a generally flat or textured edge bearing surface 24. A cylindrical boss 26 projects coaxially outward from one side of disk portion 23 for a distance somewhat greater than the thickness of disk portion 23. A bore 27, to accept axle 20, extends axially through both boss 26 and disk portion 23. Wheels 18 are then arranged in assembly 10 with boss 26 of adjacent wheels alternating in direction as is shown to provide clearance for the overlap between the disk portion 23 of adjacent wheels. The wheels may be machined from circular stock of a suitable material or preferably may be molded from a construction plastic such as polyurethane.

Figure 4:
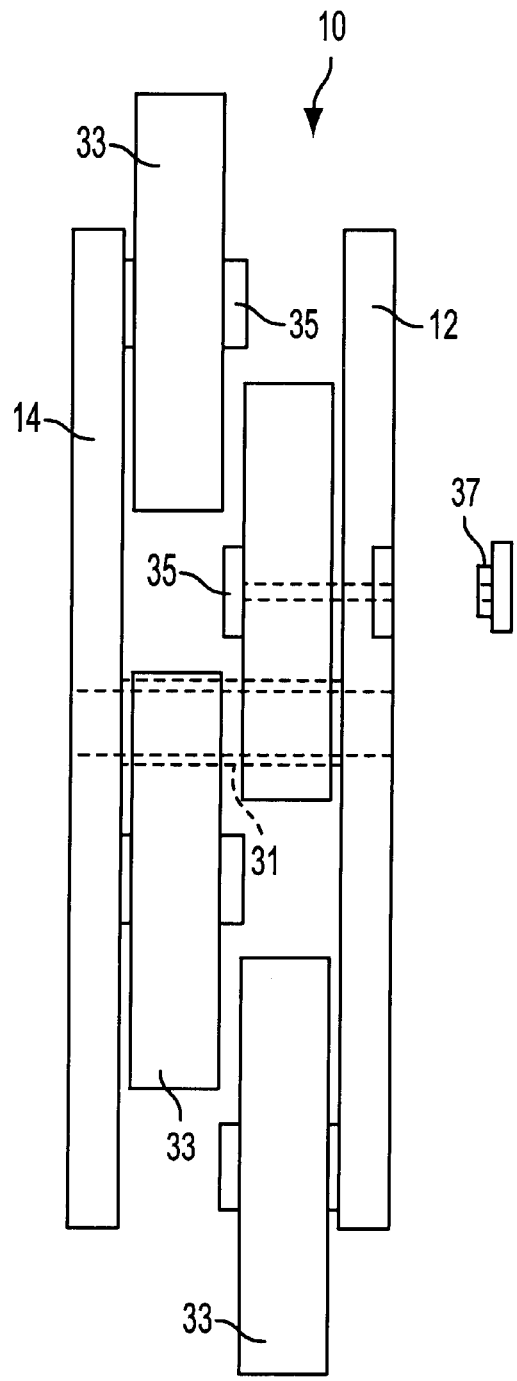
FIG. 4 is an end-on view showing a second embodiment of the wheel assembly of FIG. 1.

FIG. 4 illustrates another embodiment of wheel assembly 10. This embodiment may use the same wheel holders 12 and 14 as does the embodiment of FIG. 2. However, in this embodiment the two wheel holders are secured one to the other in an held apart relationship by way of a cylindrical spacer and bearing member 31 disposed axially with the two wheel holders. Wheels 33 of this embodiment are disk shaped without the projecting boss of wheels 18. The wheels are mounted on stub axles 35 which extend inwardly from the wheel holders 12 and 14 and are arranged so that adjacent wheels are journaled one from holder 12 and the next from holder 14. Axles 35 may be secured to the wheel holders by means of locking nut 37. As with the embodiment of FIG. 2, wheels 33 are located equidistant one from the other and from the center of bearing member 31 at a distance less than the diameter of the wheels.

Figure 5:
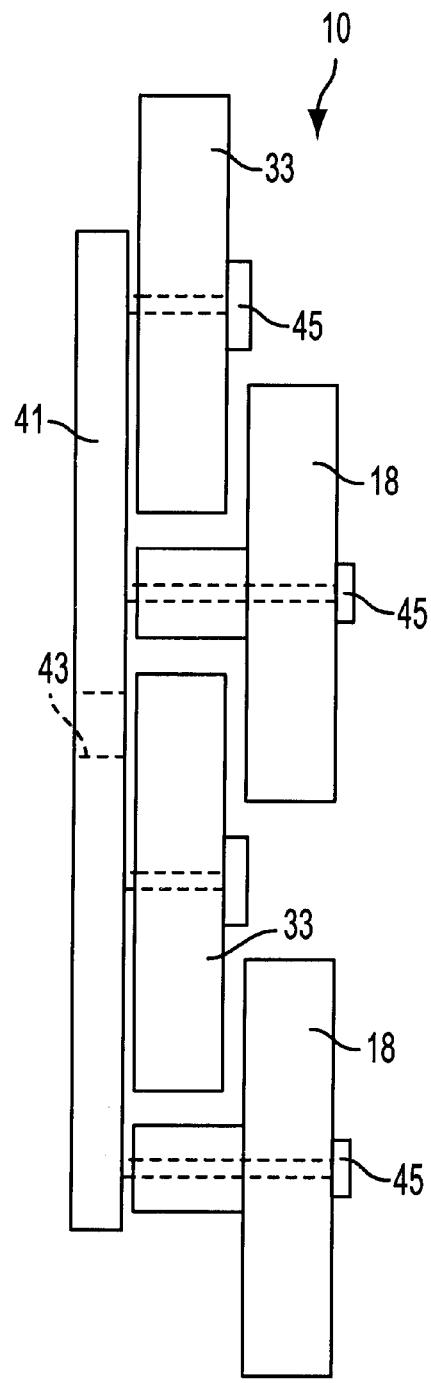
FIG. 5 is an end-on view showing a third embodiment of the wheel assembly of FIG. 1.

A third embodiment of the wheel assembly is illustrated in FIG. 5. This embodiment employs but a single wheel holder 41 that is provided with a central bore 43 journaled for rotation about a shaft or axle. At least four stub axles 45 are fixed to holder 41 and the disk-like wheels 33. of the FIG. 4 embodiment are mounted on the axles alternating with the wheels 18 of FIG. 2 to obtain an overlapping arrangement as is shown. As in the embodiments of FIGS. 2 and 4, wheels 33 and 18 are all the same diameter and are equi-spaced, one from another, at a distance less than that of the wheel diameter.

Figure 6:
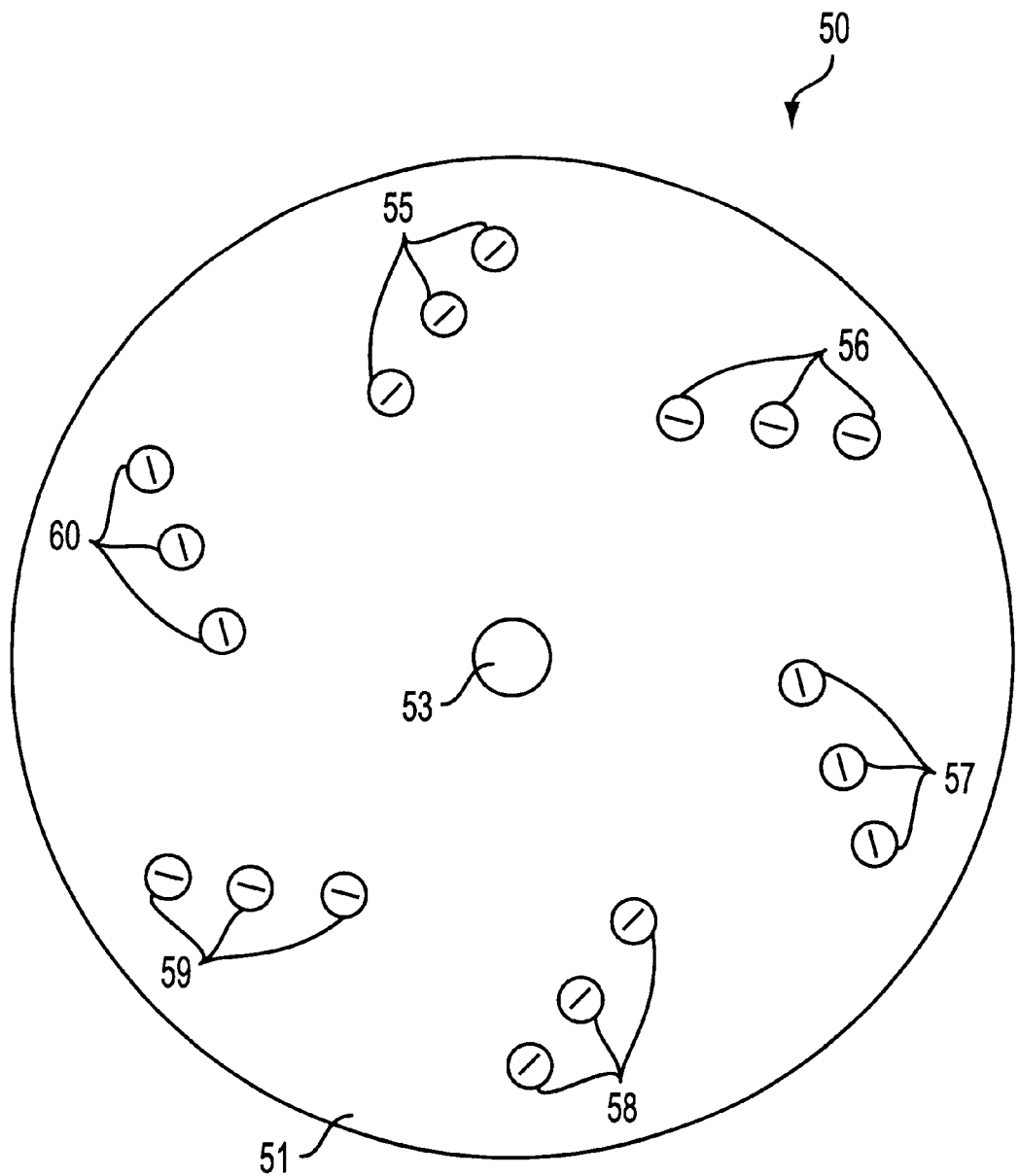
FIG. 6 shows an element of the primary wheel member that may be used in either the FIG. 2 or the FIG. 4 embodiment.

FIG. 6 illustrates a wheel holder 50 that may be used in either the FIG. 2 or FIG. 4 embodiments. Holder 50 comprises a flat, generally circular plate 51 having a centered bore 53 to allow rotation of the wheel holder about an axle. Plate 51 is provided with a plurality of equi-spaced, grouped openings 55, 56, 57, 58, 59 and 60, each opening adapted for the mounting of a stub axle therein. As shown in this figure each group of openings comprises a plurality, suitably three, of axle-accepting holes bored through plate 51 at differently spaced radial distances from the central bore. The outermost holes of each grouping are spaced apart an equal distance one from another, and from the central bore as well. A similar relationship holds among the center and innermost holes of each grouping. It is preferred that the holes of each grouping not be located along a common radial line of plate 51 in order to obtain maximum structural strength. This arrangement allows installation of different sized groups of secondary wheels onto the same wheel holders.

Referring once again to FIG. 1, there is shown a partially broken away side view of the wheel assembly 10 rolling along a surface 70 as it bumps into obstruction 72. Obstruction 72 typically might be an electrical cord or pneumatic line lying on a workplace floor, a small stone or branch on a parking lot or pavement surface, or an irregularity in a sidewalk. As assembly 10 moves to the right along an unobstructed surface, only the lowermost two, 18a and 18b, of the secondary wheels are in rolling contact with surface 70. The remaining secondary wheels and the primary wheel are motionless. As secondary wheel 18b strikes obstruction 72 it stalls and causes a right-ward rotational tilt of the entire wheel assembly 10, bringing secondary wheel 18c downward to roll over obstruction 72. The force required to precipitate that rotational tilt is modest, amounting to little more than the force required to lift the wheel assembly (and the weight that it supports) a short distance. That distance comprises a span amounting to the difference in distance 77 between the centerpoint 75 of wheel assembly 10 and surface 70 and the longest distance 79 between centerpoint 75 and the circumference of the wheel, 18b, in contact with the obstruction 72. Distance 77 may be viewed as being the effective radius of the wheel assembly, and twice that distance then constitutes the effective diameter of the wheel assembly. As may be appreciated, the structure of the wheel assembly allows it to literally walk over small obstructions.

As has been set out before, the wheel assembly of this invention requires a minimum of four secondary wheels equi-spaced around the circumference of a primary wheel means. Because the diameter of each secondary wheel is greater than is the distance between wheels, adjacent wheels overlap and are offset one to another. Thus, when the wheel assembly traverses a surface, the two wheels in contact with that surface follow separate, parallel tracks, one wheel in each track. That geometry, separate and parallel tracking of adjacent wheels, tends to increase the stability of a wheel assembly that is pivotally attached to a load-supporting frame through a conventional yoke or horn arrangement. It can further be appreciated that the overlapping arrangement of adjacent secondary wheels can best be obtained through use of an even number of secondary wheels, preferably four, six, or eight and most preferably six. It is conceptually possible to utilize an odd number of secondary wheels, say five or seven, but an odd number of secondary wheels requires three, rather than two, parallel wheel tracks. Such an arrangement necessitates a wider wheel assembly to accommodate the three tracks, is more complicated in construction, and has less rolling stability than does a wheel assembly having an even number of secondary wheels.

FIGS. 7–10 illustrate a group of preferred applications for the wheel assembly of this invention. FIG. 7 depicts wheel assembly 10 in use with a carrier module 80 which may be any load carrying container, for example, a piece of luggage, medical or electronic test equipment, a tool chest, or items of a similar nature which are moved from place to place across obstructed surfaces. A plurality, typically three or four, of wheel assemblies 10 are mounted to a bottom load supporting member or frame 82 of carrier module 80. The wheel assemblies may be fixedly or pivotally mounted to frame 82 as is desired. A handle means 84 may be attached to module 80 for ease of towing or pushing the module.

FIG. 8 illustrates wheel assemblies 10 in use with a piece of furniture, in this case an office chair 90. One wheel assembly 10 is pivotally mounted to each chair leg member 92 by means of a conventional horn bracket 93, thus allowing the chair to be freely rolled in any direction.

FIG. 9 shows the wheel assembly 10 of this invention used with a grocery or shopping cart 95. In many parts of the country, purchased goods such as groceries are carried from the store to an automobile that may be parked in a lot some distance from the store with the same shopping cart that was used to gather goods in the store. Conventional wheels, particularly the two front, swiveled wheels, tend to stall and drag when the cart is pushed over debris, such as gravel and small branches, that is commonly found in parking lots. Wheel drag is substantially eliminated by replacing the two front cart wheels with the wheel assemblies 10 of this invention as is shown in the Figure. The two rear cart wheels 97 may be replaced as well, but the drag problem is not as severe with the rear wheels as it is with the front.

Figure 10:
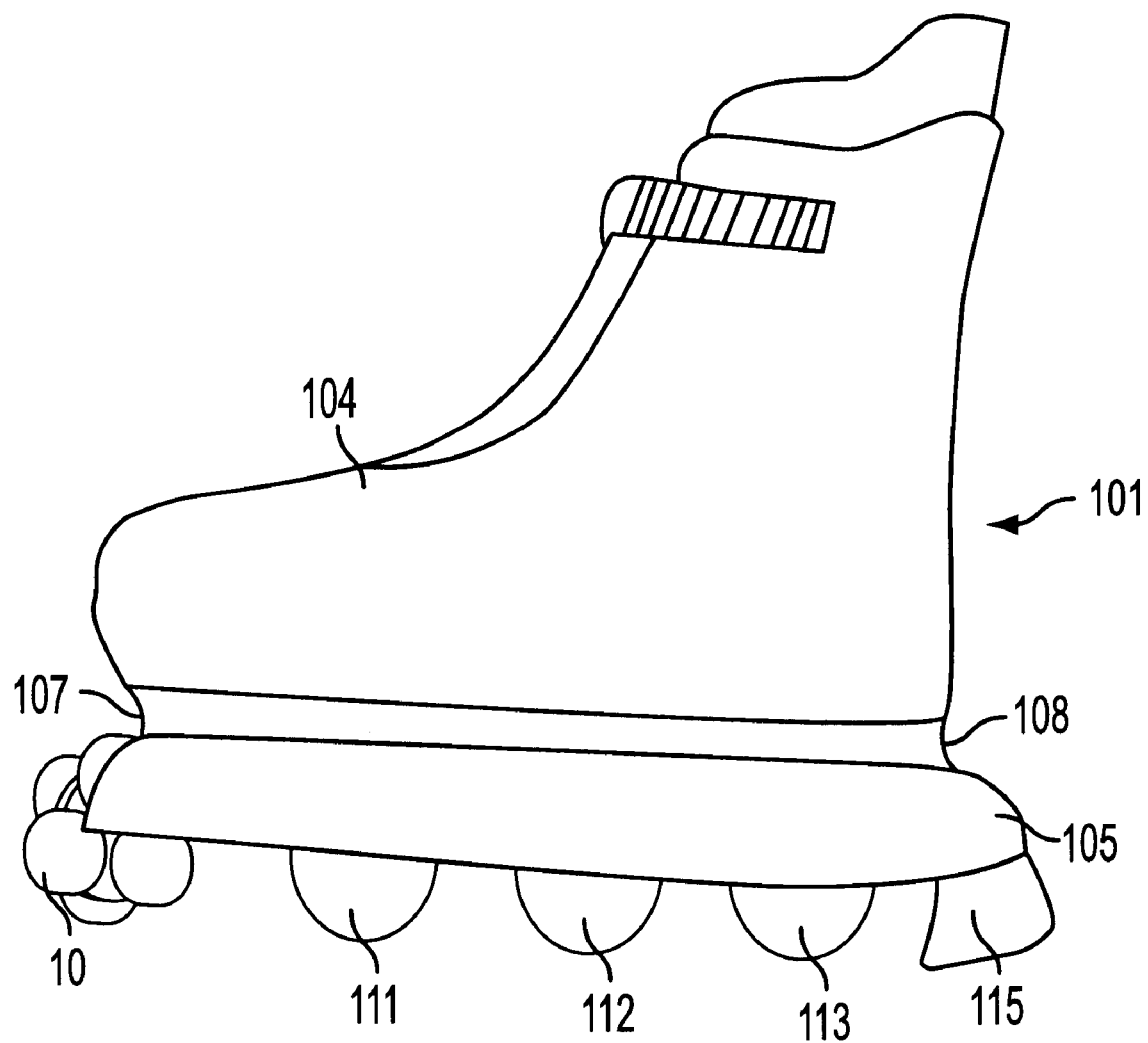
FIG. 10 shows the inventive wheel assembly used as the front, or lead, wheel of an in-line skate.

FIG. 10 depicts another preferred use for the wheel assembly of this invention. The Figure shows an in-line skate 101 comprising a boot 104 having a linear chassis 105 attached to the boot sole by means of brackets 107 and 108. Chassis 105 supports a plurality of wheels 10, 111, 112, and 113 arranged one behind the other to track in the same path. A drag brake 115 projects downwardly from the chassis at the rear thereof. The front, or lead, wheel 10 comprises the wheel assembly of this invention while the trailing three wheels 111, 112 and 113, are conventional. The three trailing wheels are all the same diameter, and it is preferred that the effective diameter of wheel assembly 10 be equal to that of the other three wheels. Effective diameter here is defined as was set out earlier in the discussion of FIG. 6.

Users of in-line skates risk falling when a skate hits an obstacle that the front or lead wheel cannot surmount or which causes that wheel to drag. Wheel assembly 10 easily rides over obstacles which cause an ordinary wheel to jam or drag, and the trailing wheels of the skate then tend to ride over the obstacle as well, thus enhancing skating safety. Similar advantages are obtained by the use of wheel assembly 10 on scooters. In this embodiment, frame 82 comprises a platform on which the scooter user stands.

The wheel assembly of this invention has been shown and described with respect to certain embodiments thereof and that description is for the purpose of illustration and not limitation. Other variations and modifications of the described invention will be apparent to those skilled in the art and are included within the scope of the invention as set out in the appended claims.

I claim:

1. A wheel assembly comprising:
    a primary wheel including a generally planar wheel holder that is rotatable about a central axis, said wheel holder comprising two parallel, spaced apart plates, said plates supporting a plurality of axles extending perpendicularly therebetween, one axle for each secondary wheel; and
    at least four secondary wheels of equal diameter rotatably mounted on the holder at locations equidistant apart, one from the next, and equidistant as well from the central axis of the holder, the distance between each wheel location being less than the diameter of said wheels, each said secondary wheel including a cylindrical, disk section having an edge bearing surface, and having a boss extending coaxially from one side thereof, the length of said boss being equal to or greater than the thickness of said disk section.

2. The wheel assembly of claim 1 wherein said wheel assembly includes an even number of secondary wheels, and wherein adjacent secondary wheels are mounted such that the boss portion of each wheel is oriented in an opposite direction, whereby adjacent wheels are caused to roll in two separate and parallel tracks.

3. The wheel assembly of claim 1 having six secondary wheels.

4. The wheel assembly of claim 1 including a load-bearing frame that is supported by said wheel assembly.

5. The wheel assembly of claim 4 wherein said frame supports a piece of luggage, and wherein all of said wheel means comprise said wheel assembly which includes a primary wheel having secondary wheels mounted thereon.

6. The wheel assembly of claim 4 wherein said frame supports a carrier for instruments of tools, and wherein all of said wheel means comprise said wheel assembly.

7. The wheel assembly of claim 4 wherein said frame supports a shopping cart.

8. The wheel assembly of claim 7 wherein said shopping cart has four wheel means, two front wheel means and two rear wheel means, and wherein the two front wheel means comprise said wheel assembly.

9. The wheel assembly of claim 4 wherein said frame supports the boot of an in-line skate, and wherein said frame comprises a chassis having a plurality of wheel means mounted thereon, one behind the other.

10. The wheel assembly of claim 9 wherein the front wheel means of said skate comprises said wheel assembly, and wherein the effective diameter of said wheel assembly is equal to the diameter of the other skate wheel means.

11. The device of claim 4 wherein said frame comprises the platform of a scooter.

12. A device for transporting loads across an obstacle-strewn surface comprising:
    a load-supporting frame; and
    a plurality of wheel means supporting said frame to allow rolling movement of the frame across a surface, at least one of said wheel means being a wheel assembly comprising a primary wheel which includes a generally planar wheel holder that is rotatable around a central axis, said holder comprising two parallel, spaced apart plates, said plates supporting at least four axles extending perpendicularly therebetween, one axle for each secondary wheel, at least four secondary wheels of equal diameter rotatably mounted on said axles at locations equidistant apart and equidistant from said axis, the distance between adjacent wheels being less than the diameter of said wheels, each said secondary wheel including a cylindrical, disk section having an edge bearing surface, and having a boss extending coaxially from one side thereof, the length of said boss being equal to or greater than the thickness of said disk section.

13. The device of claim 12 wherein said frame supports a piece of luggage, and wherein all of said wheel means comprise said wheel assembly which includes a primary wheel having secondary wheels mounted thereon.

14. The device of claim 13 wherein all of said wheel means comprise said wheel assembly that includes a primary wheel having secondary wheels mounted thereon.

15. The device of claim 12 wherein said frame supports a carrier for instruments of tools, and wherein all of said wheel means comprise said wheel assembly.

16. The device of claim 12 wherein said frame supports a shopping cart.

17. The device of claim 16 wherein said shopping cart has four wheel means, two front wheel means and two rear wheel means, and wherein the two front wheel means comprise said wheel assembly.

18. The device of claim 12 wherein said frame supports the boot of an in-line skate, and wherein said frame comprises a chassis having a plurality of wheel means mounted thereon, one behind the other.

19. The device of claim 18 wherein the front wheel means of said skate comprises said wheel assembly, and wherein the effective diameter of said wheel assembly is equal to the diameter of the other wheel means.

20. The device of claim 12 wherein said frame comprises the platform of a scooter.

21. The load transporting device of claim 12 wherein said wheel assembly has six secondary wheels.

* * * * *